Sept. 14, 1937.  R. BERNHARD  2,093,026
GYRATORY CRUSHER SUSPENSION
Filed Feb. 18, 1936

Inventor
Richard Bernhard
By Eugene A. Purse
Attorney

Patented Sept. 14, 1937

2,093,026

UNITED STATES PATENT OFFICE 2,093,026

GYRATORY CRUSHER SUSPENSION

Richard Bernhard, Allentown, Pa., assignor to Traylor Engineering and Manufacturing Company, a corporation of Delaware Application February 18, 1936, Serial No. 64,590

5 Claims. (Cl. 83—10)

This invention relates to gyratory crushers, and more particularly to an improved shaft suspension for such crushers.

An important object of my invention is to provide a gyratory crusher in which the bearing which rockingly supports the shaft carrying the crusher head is so constructed and arranged to withstand the heavy downthrusts exerted upon the shaft during the crushing operation, and which, at the same time, affords means for vertically adjusting the position of the shaft and for maintaining the shaft in its various positions of adjustment.

Another object of my invention is to provide a gyratory crusher having a shaft suspension of the above character incorporating a quick-releasable nut designed to effect a tight binding engagement with the shaft but which at the same time is capable of being readily unscrewed from the shaft.

The invention has as a further object to provide a shaft suspension for a gyratory crusher which is of simple and rugged construction, and which is efficient in operation and free from mechanical difficulties.

Other objects and advantages will become apparent from the following detailed description of a preferred embodiment of my invention, reference being had to the annexed drawing in which.

Figure 1:
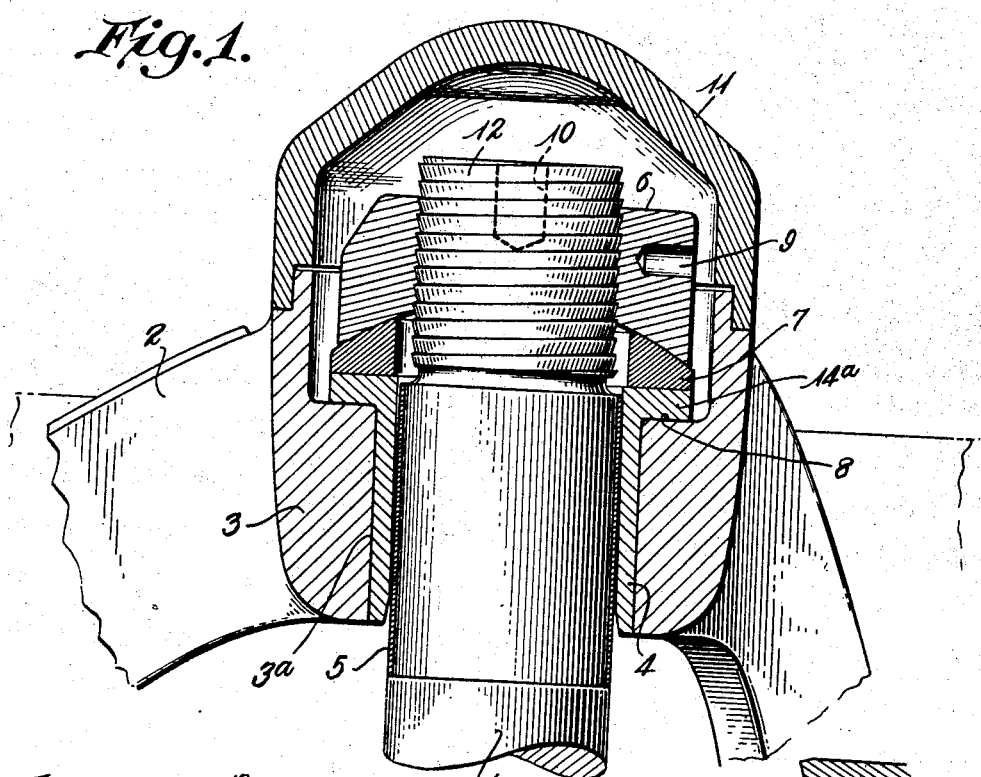
Figure 1 is an enlarged vertical cross-sectional view through the top of a gyratory crusher showing the bearing for supporting the shaft carrying the crusher head.

In Fig. 1 is shown the top of a gyratory crusher which may be of any conventional form such, for example, as that illustrated in U. S. Patent No. 1,329,848, of Charles H. Patten, dated February 3, 1920. As is usual in this type of crusher, a vertical cylindrical shaft 1 which carries the crusher head is freely suspended at its upper end by a spider 2 by means of a bearing which supports the weight of the shaft and permits limited rocking movement of the shaft during the crushing operation.

This bearing according to the present invention is constructed as follows: The spider 2 terminates in a central hub 3 having a vertical bore 3a therethrough which is of enlarged diameter at its upper end, the two diameters being connected by a horizontal ledge 8. In the smaller diameter of this bore is accommodated a bushing 4 which latter loosely passes the upper end of shaft 1. The portion of this shaft which traverses the bushing is of reduced diameter and is enclosed in a hardened metal sleeve 5 which is shrunk upon the shaft to provide a renewable wearing surface thereabout.

The end of the shaft is threaded to receive a suspension nut 6, the bottom face of which is concavely recessed so as to snugly seat upon the convex upper face of a washer 7 loosely surrounding the shaft out of contact with its threads. This washer rests flatly upon a radial flange 14a formed on the upper end of the bushing 4 which flange in turn is supported upon the horizontal ledge 8.

The suspension nut, which may be of square, hexagonal or any other conventional shape, is provided with a radial recess or recesses 9 for engagement with a suitable tool to facilitate rotating the nut. The upper end of the shaft is centrally tapped as at 10 to receive an eye bolt when the shaft is to be removed from the apparatus. The diameter of flange 14a and washer 7 is less than the diameter of the enlarged bore of the hub to provide a pocket surrounding the washer for the reception of a lubricant. The top of the enlarged bore is closed by a cap 11 interfitting with and secured to the hub 3.

Figure 2:
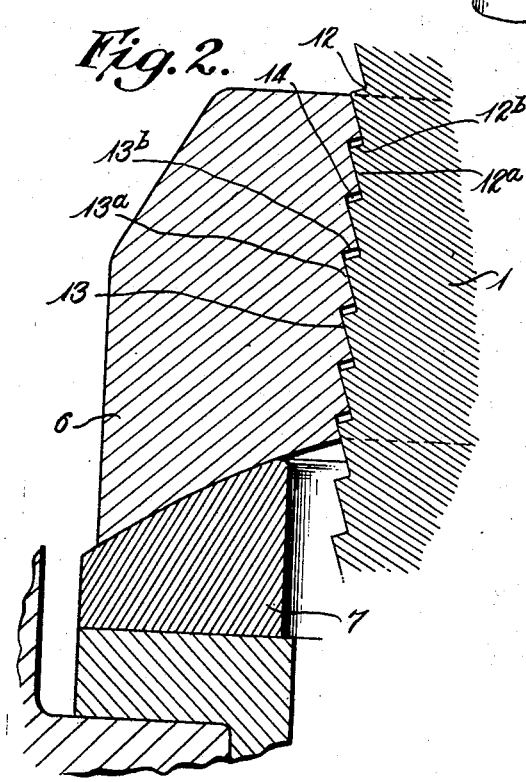
Figure 2 is a detail cross-sectional view of the shaft and suspension nut illustrating the manner in which the tapered threads between the nut and the shaft coact to support the shaft.
Figure 3:
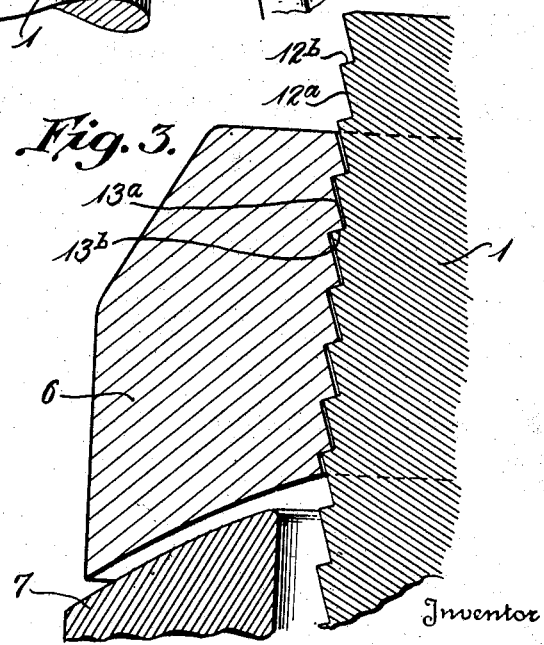
Figure 3 is a cross-sectional view, similar to that of Fig. 2, showing the position of the nut preparatory to its removal from the shaft.

An important feature of my invention resides in the conformation of the screw threads which afford the connection between the suspension nut 6 and shaft 1, these threads being more clearly shown in the enlarged cross-sectional views of Figs. 2 and 3. As shown in these figures, the shaft 1 is provided with a helical thread 12 constituted of a relatively long downwardly and inwardly tapered face 12a and a relatively short, abrupt transverse face 12b this thread presenting in cross-section a sawtooth profile as seen in Fig. 1. In a similar manner the suspension nut 6 is tapped so as to provide a helical thread 13, complementary in form to the thread 12, and comprising a relatively long upwardly and inwardly tapered face 13a, and a relatively short transverse face 13b parallel to the short face 12b of the shaft thread.

The pitches of the threads upon the shaft and nut respectively are equal, but in order to accomplish the purpose of the invention the root diameter of the thread upon the nut is slightly in excess of the root diameter of the thread upon the shaft. This results in a slight longitudinal offset of one thread relative to the other when the nut is assembled on the shaft, and forms a small gap 14 between the transverse faces 12a and 13a of the two threads. Thus the weight carried by the shaft and the downthrust exerted thereon due to the crushing action causes the long face 12a of the shaft thread 12 to slide over the long face 13a of the nut thread 13 and to wedge these faces tightly together. By reason of this construction the shaft is centered with respect to the nut and the nut is always held tightly engaged with the shaft due to the jamming action between the threads. Furthermore, any play resulting from wear between the threads is automatically taken up by reason of the tapered conformation of the cooperating faces 12a and 13a of the threads.

Another advantage of this form of shaft mounting is the facility with which the shaft may be removed from the apparatus when replacements of the wearing surfaces of the crusher head or of the sleeve 6 become necessary. When it is desired to remove the shaft, an eyebolt is screwed into the tapped opening 10. The hook connected to a vertical hoist or to a block-and-tackle is engaged with the eye and the shaft is lifted so as to unseat the concave bottom of nut 6 from the convex bearing face of washer 7, as indicated in Fig. 3. The nut is then struck a light blow with a hammer so as to slide the nut downwardly along the shaft to the extent permitted by the gap 14, whereupon the long faces 12a and 13a of the threads ride out of binding contact, as shown in Fig. 3, and the nut is capable of being readily turned by a key inserted in recess 9 to remove it from the shaft.

It will be obvious that instead of employing only a single thread between the shaft and nut these mating members may be provided with duplex or multiple threads. If desired a longitudinal key or feather may be additionally provided for positively locking the suspension nut 6 to the shaft. Furthermore the nut need not be supported directly upon the washer 7, but an intermediate member or members may be interposed between the nut and washer. Manifestly other changes in arrangement and design may be made in the form of suspension described above without departing from the spirit of my invention.

I claim:

1. In a gyratory crusher, a suspension for the crusher shaft comprising an annular bearing member loosely surrounding the shaft and a suspension nut mounted upon the upper end of the shaft and gravitationally supported upon the annular member, and said nut and shaft being connected by complementary helical threads each having an extended longitudinal face and a short transverse face, the longitudinal face of the thread upon the shaft tapering downwardly and inwardly and the diameter of the thread upon the nut slightly exceeding the diameter of the thread upon the shaft.

2. In a gyratory crusher, a suspension for the crusher shaft comprising an annular bearing member loosely surrounding the shaft and a suspension nut mounted upon the upper end of the shaft and gravitationally supported upon the annular member, said nut being mounted for limited rocking movement relative to said bearing member, and said nut and shaft being connected by complementary helical threads each having an extended longitudinal face and a short transverse face, the longitudinal face of the thread upon the shaft tapering downwardly and inwardly and the short face being substantially shorter than the longitudinal face and disposed generally perpendicular to the axis of the shaft and the diameter of the thread upon the nut being slightly in excess of the diameter of the thread upon the shaft.

3. In a gyratory crusher, a suspension for the crusher shaft comprising an annular bearing member loosely surrounding the shaft and a suspension nut mounted upon the upper end of the shaft and gravitationally supported upon the bearing member, said nut being mounted for limited rocking movement relative to said bearing member, and said nut and shaft being connected by complementary helical threads each having an extended longitudinal face and a short transverse face, the longitudinal face of the thread upon the shaft tapering downwardly and inwardly and the short face being substantially shorter than the longitudinal face, and the diameter of the thread upon the nut being slightly in excess of the diameter of the thread upon the shaft, the arrangement being such that the thread of the nut is offset longitudinally with respect to the thread of the shaft.

4. In a gyratory crusher, a suspension for the crusher shaft comprising an annular bearing member loosely surrounding the shaft and a suspension nut mounted upon the upper end of the shaft and gravitationally supported upon the bearing member, said nut being mounted for limited rocking movement relative to said bearing member, and said nut and shaft being connected by helical threads each having an extended longitudinal face and a shorter transverse face, the longitudinal face of the thread upon the shaft tapering downwardly and inwardly and the longitudinal face of the thread upon the nut tapering upwardly and inwardly and in wedging engagement with the longitudinal face of the thread upon the shaft and the short transverse faces of the threads upon the shaft and the nut being disposed in slightly spaced relation.

5. In a gyratory crusher, a suspension for the crusher shaft comprising an annular bearing member loosely surrounding the shaft and a suspension nut mounted upon the upper end of the shaft and gravitationally supported upon the bearing member, said nut being mounted for limited rocking movement relative to said bearing member and said nut and shaft being connected by helical threads each having a longitudinal face and a transverse face, the longitudinal face of the thread upon the shaft tapering downwardly and inwardly and the longitudinal face of the thread upon the nut tapering upwardly and inwardly and in wedging engagement with the longitudinal face of the thread upon the shaft, and the transverse faces of the threads upon the shaft and nut being disposed out of contact so as to provide a small helical clearance space therebetween.

RICHARD BERNHARD.